US006490046B1

(12) United States Patent
Drabarek et al.

(10) Patent No.: US 6,490,046 B1
(45) Date of Patent: Dec. 3, 2002

(54) MODULATION INTERFEROMETER AND FIBEROPTICALLY DIVIDED MEASURING PROBE WITH LIGHT GUIDED

(75) Inventors: Pawel Drabarek, Tiefenbronn (DE); Marc-Henri Duvoisin, Préverenges (CH); Dominique Marchal, Vallorbe (CH); Vincent Thominet, Echandens (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,785

(22) PCT Filed: Apr. 27, 1999

(86) PCT No.: PCT/DE99/01242

§ 371 (c)(1),
(2), (4) Date: Feb. 5, 2001

(87) PCT Pub. No.: WO99/57506

PCT Pub. Date: Nov. 11, 1999

(30) Foreign Application Priority Data

May 4, 1998 (DE) .......................................... 198 19 762

(51) Int. Cl.$^7$ ................................................ G01B 9/02
(52) U.S. Cl. ...................................... 356/489; 356/477
(58) Field of Search ................................ 356/496, 477, 356/482, 486, 489

(56) References Cited

U.S. PATENT DOCUMENTS

| 4,627,731 A | | 12/1986 | Waters | |
| 5,349,440 A | * | 9/1994 | DeGroot | 356/489 |
| 5,359,415 A | * | 10/1994 | Tabarelli | 356/482 |

FOREIGN PATENT DOCUMENTS

| DE | 36 32 978 | 3/1988 |
| DE | 39 06 118 | 8/1990 |
| DE | 195 22 262 | 1/1997 |
| DE | 198 08 273 | 9/1999 |
| EP | 0 126 475 | 11/1984 |
| EP | 0 401 694 | 12/1990 |

OTHER PUBLICATIONS

Rao et al., *Recent progress in fibre optic low–coherence interferometry*, Meas. Sci. Technol., Bd. 7, 1. Jul, 1, 1996, pp. 981–999.

Grübel et al., *Interferometrisches Echtzeitwegmessystem mit vollständig . . .*, TM Technisches Messen, BD. 58, Nr. 4, 1. Apr. 1, 1991, pp. 165–169.

* cited by examiner

Primary Examiner—Robert H. Kim
Assistant Examiner—Elizabeth Gemmell
(74) Attorney, Agent, or Firm—Kenyon & Kenyon

(57) ABSTRACT

An interferometric measuring device for detecting the shape, roughness or distance of surfaces is described. The interferometric measuring device has a modulation interferometer in which two partial beams are formed, one of which is shifted in its light phase or light frequency with respect to the other by a modulation device. The surface is measured with a measuring probe which is connected to the modulation interferometer and in which a measuring beam and a reference beam are formed, and an interference pattern which is analyzed in a connected receiving unit is formed from the measuring beam and the reference beam. A compact design that is easy to handle even in a manufacturing process is achieved by spatially separating the modulation interferometer which is designed as a basic unit from the measuring probe and by the fact that it can be connected to the measuring probe by an optical fiber arrangement, and the measuring arm and the reference arm are formed by solids conducting the measuring beam and the reference beam.

10 Claims, 3 Drawing Sheets

MODULATION INTERFEROMETER AND FIBEROPTICALLY DIVIDED MEASURING PROBE WITH LIGHT GUIDED

FIELD OF THE INVENTION

The present invention relates to an interferometric measuring device for detecting the shape, roughness or distance of surfaces by using a modulation interferometer having a spatially coherent beam source and a first beam splitter for splitting its beam into two partial beams, one of which is shifted in its light phase or light frequency with respect to the other by a modulation device and then the two partial beams are combined, having a measuring probe in which the combined partial beams are split into a measuring beam guided through a measuring arm and reflected on the surface and a reference beam guided through and reflected in a reference arm, and in which the reflected reference beam is superimposed on the reflected measuring beam, and having a receiving unit for splitting the superimposed beam into at least two beams having different wavelengths and converting the beams into electrical signals, and for analyzing the signals on the basis of a phase difference.

BACKGROUND INFORMATION

An interferometric measuring device is known from European Patent No. 126 475. In this known measuring device, rough surfaces of a measured object are measured interferometrically, a beam gun unit having laser light sources which emit light of different wavelengths being used. The laser light is divided into a reference beam of a reference beam path and a measuring beam of a measuring beam path using a beam splitter. The measuring beam path impinges on the surface to be measured, while the reference beam path is reflected on a reference surface, for example in the form of a mirror. The light reflected from the surface and the reference surface is combined in the beam splitter and focused, with the help of a lens, in an interferogram plane, where a speckle pattern is obtained. This speckle pattern is analyzed to determine the surface shape, a phase difference of the interferogram phases in the measuring point being determined. In order to simplify the analysis, a heterodyne method is used, the frequency of the reference beam being shifted with respect to the frequency of the measuring beam by a heterodyne frequency using a frequency shifter in the reference beam path. With this measuring device, a fine resolution of the surface shapes can be obtained.

However, the adjustment and handling are complicated for use in industrial manufacturing, for example.

Another interferometric measuring device is described in German Published Patent Application No. 39 06 118, in which optical fibers are provided between a plurality of laser light sources and a measuring section. Here again, a phase difference is evaluated for determining the surface structures. This known design is also disadvantageous with regard to the handling and adjustment in places that are difficult to access.

Another interferometric measuring device, as described in German Published Patent Application No. 198 08 273, which was not published previously, this device having a modulation interferometer and a spatially separate measuring probe connected to it by an optical fiber arrangement, is much more favorable for practical use in a manufacturing process for example. Advantages include in particular a short-term coherent radiation source of the modulation interferometer, yielding a stable beam that can be analyzed well, and the relatively compact design of the measuring probe. However, the arrangement of the measuring probe with respect to the surface of the measured object is still associated with some adjustment measures which would make a simplification seem desirable.

SUMMARY OF THE INVENTION

An object of the present invention is to provide an interferometric measuring device of the yielding simplified handling with a relatively simple, compact design.

Accordingly, the modulation interferometer designed as a basic unit which is spatially separate from the measuring probe and can be connected to it by an optical fiber arrangement, and the measuring arm and the reference arm are formed by solids conducting the measuring beam and the reference beam.

The measuring probe which is spatially separate from the modulation interferometer, which is designed as a basic unit, by the optical fiber arrangement is itself compact due to the design of the measuring arm and the reference arm as a solid and thus it is easy to handle and is designed to be easily adjustable with respect to the measured object. It is easy to adjust the reference arm and the measuring arm of the measuring probe relative to one another and with respect to the interferometric measuring device because of the unambiguous positioning of the individual elements.

If the design is such that a collimator device is provided at the input of the measuring probe and a focusing device is provided at the output of the measuring arm, and a deflecting element downstream from the focusing device is provided for output and then re-injection of the measuring beam directed at and reflected by the surface to be measured, then a favorable measuring beam and reference beam are obtained to form the interference pattern, and on the other hand the measuring beam can be aligned perpendicular to the measuring arm due to the deflecting element even when the surface to be measured is at an inclination to the direction of the measuring arm, so that a reliable measurement of the surface is achieved. An advantageous embodiment involves the collimator device and/or the focusing device being a GRIN lens.

Interference of the two partial beams before entering the measuring probe is prevented by the fact that one of the two partial beams in the modulation interferometer passes through a delay element which generates a difference in the optical path lengths of the two partial beams which is greater than the coherence length of the beam emitted by the short coherent beam source, and another difference in the optical path lengths is generated in the measuring arm with respect to the reference arm, compensating for the difference in optical path lengths generated by the delay element, and this interference comes about only after reflection at the surface or in the reference arm and thus coherence multiplexing is made possible.

Multiple sections of the surface to be measured or multiple separate surfaces can be measured rapidly and reliably without repositioning the measuring probe by the fact that the measuring arm has at least one additional deflecting element with which the measuring beam guided in the measuring arm is split and directed at another site on the surface to be measured, and the measuring beam reflected by this surface is injected back into the measuring arm. There are two different design possibilities here due to the fact that different optical path lengths can be preselected in the modulation interferometer by different interchangeable delay elements, and the compensating difference in the optical path lengths is formed by adjusting a reflecting or deflecting element of the reference arm or due to the separate reference arms assigned to the individual measuring beams split off in coordination with the different delay elements. If separate reference arms are provided, then the selected measuring site on the surface is obtained unambiguously by allocation to the corresponding delay element without further adjustment through coherence multiplexing. However, it is relatively simple to adjust the compensating optical path difference of the measuring arm with respect to the reference arm by the reflecting and deflecting element of the reference arm.

Two different design options for the measuring probe consist of the fact that the measuring arm and the reference arm(s) are designed as separate arms of the measuring probe in the manner of a Michelson interferometer (as illustrated in FIGS. 1 and 2) or in a common arm in the manner of a Fizeau interferometer (as illustrated in FIG. 3). If the measuring arm and the reference arm here are designed in a common arm of the measuring probe, this yields an especially compact design of the measuring probe, which can be used even under unfavorable space conditions.

A further simplification of the design of the measuring device is achieved due to the fact that the beam directed toward and away from the measuring probe is passed over a common monomode optical fiber arrangement, and the beam sent to the receiving unit is output from the optical fiber arrangement by an arm section. Coupling of the measuring probe to the modulation interferometer and the receiving unit can be accomplished easily by using plug connectors.

DETAILED DESCRIPTION

Figure 1:
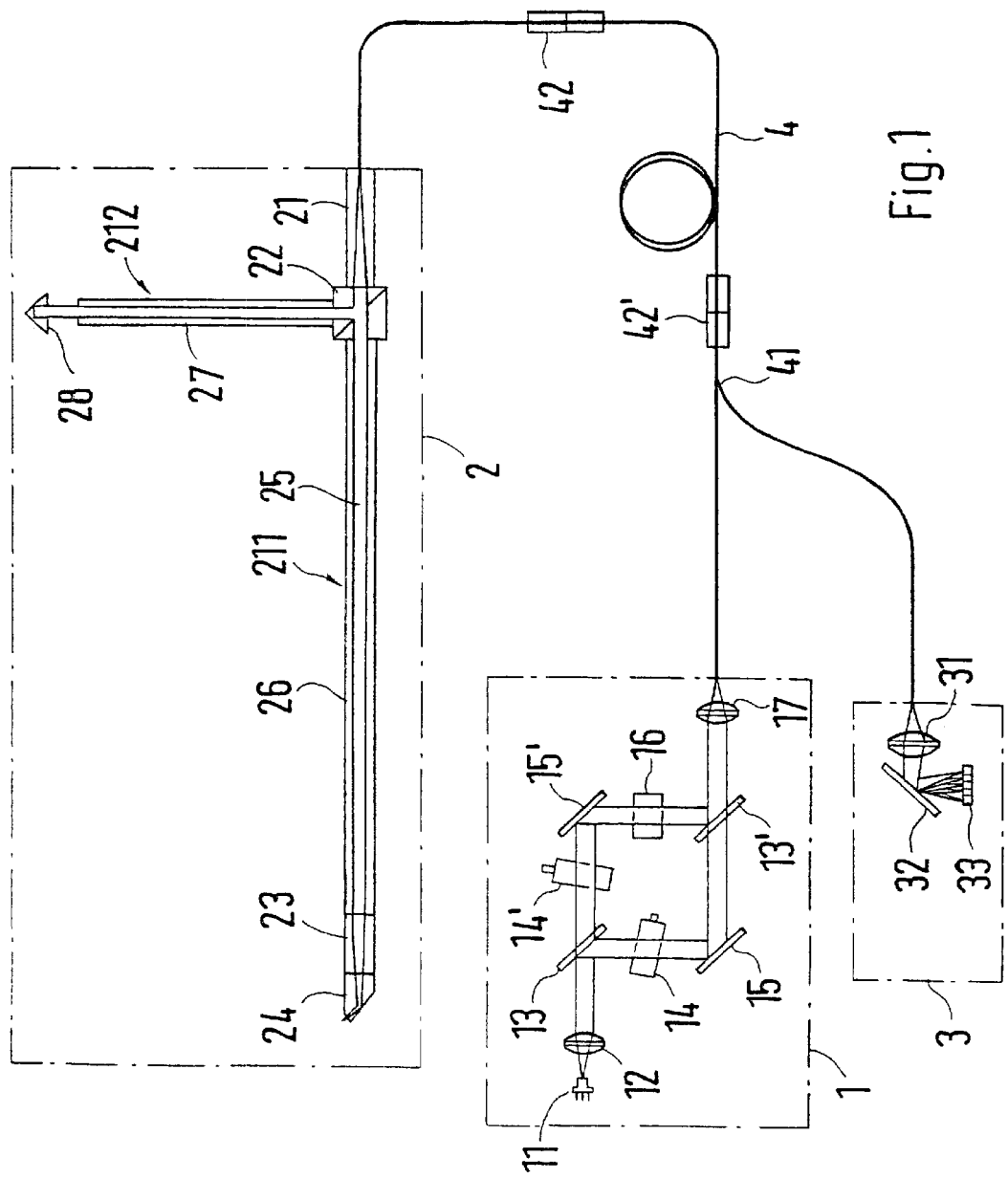
FIG. 1 shows a schematic diagram of an interferometric measuring device having a measuring probe which is spatially separate from a modulation interferometer.
Figure 2:
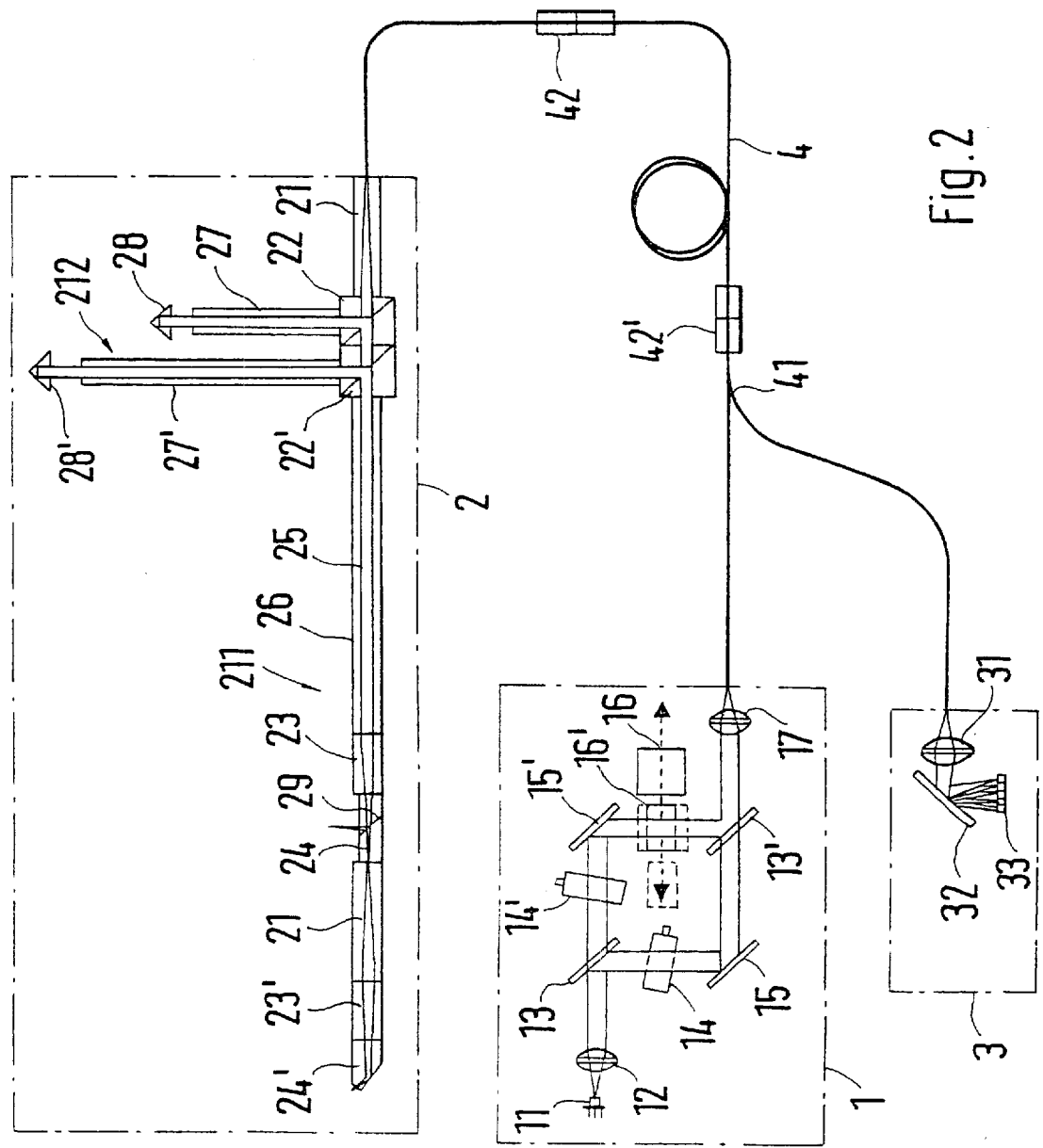
FIG. 2 shows another embodiment of the interferometric measuring device having a plurality of measuring beams and reference beams.
Figure 3:
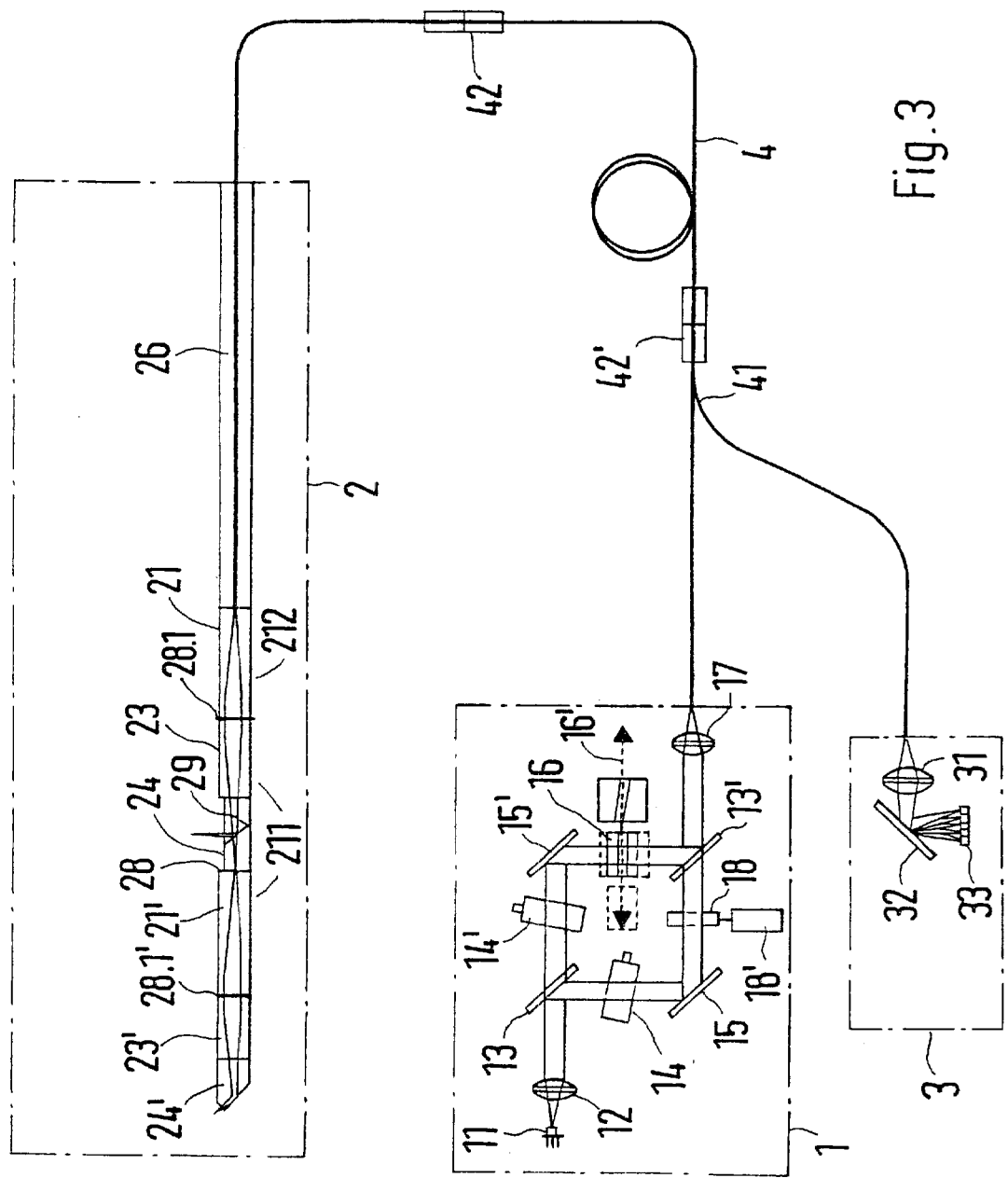
FIG. 3 shows another embodiment of the interferometric measuring device, where the measuring arm and the reference arm are designed differently.

The embodiments of an interferometric measuring device illustrated in FIGS. 1 through 3 for determining the shape, roughness or distance of surfaces each have a modulation interferometer 1 and a measuring probe 2 spatially separate from the interferometer and coupled to it by an optical fiber arrangement 4 and also a receiving unit 3 to receive the beam returned by the measuring probe.

Modulation interferometer 1 has a beam source 11, preferably in the form of a short coherent broad-band beam source 11 having a continuous radiation distribution of a plurality of different wavelengths with good spatial coherence at the same time, such as a superluminescence diode. The beam from beam source 11 is collimated by a collimator lens 12 and split by a first beam splitter 13 into two partial beams, each of which is passed through acousto-optical modulators 14, 14' and combined again by deflector mirrors 15, 15' at a second beam splitter 13', with one of the two partial beams being passed through a delay element 16 or 16' (see FIGS. 2 and 3). The combined partial beams pass through a lens system 17 into monomode optical fiber arrangement 4.

The two partial beams are modulated by acousto-optical modulators 14 or 14' with adjacent but different frequencies. An optical path difference in the two partial beams is created in the modulation interferometer, e.g., of the Mach-Zehnder type, by delay element 16 or 16', which delay element 16, 16' is designed as a glass plate of a certain thickness, for example. In this way, the partial beams which are combined by beam splitters 13' which are designed as semitransparent panes, for example, are present as separate wave trains having two adjacent but different frequencies and are shifted spatially toward one another with a length greater than the coherence length of beam source 11.

Measuring probe 2 according to FIGS. 1 and 2 is designed as an interferometer of the Michelson type. The combined light beam sent over monomode optical fiber arrangement 4 is collimated by a collimator device 21 in the form of a lens system, then split by a third beam splitter 22 into a measuring beam and a reference beam. The measuring beam is focused at the output end of a measuring arm 211 carrying the measuring beam by a focusing device 23 in the form of a lens system and deflected at the output of measuring arm 211 by a deflecting element 24 in the form of a prism in such a manner that at the outlet of the prism, the axis of the beam cone is directed perpendicularly onto the surface to be measured. The unit of prism 24 and lens system 23 can be replaced, so that surfaces having a different contour can be measured. Collimator device 21 at the input of measuring probe 2 and focusing device 23 in the end area of measuring arm 211 are preferably designed as GRIN (=grade index) lenses which offer favorable beam guidance.

The reference beam separated at the third beam splitter is sent in a reference arm 212 to a reflector element 28 in the form of a prism provided at the end of the reference arm, where it is deflected, the prism being adjustable in the direction of the optical axis of reference arm 212. Measuring arm 211, carrying the measuring beam as collimated beam 25, then has a measuring beam conducting body 26 in the form of a solid at third beam splitter 22, while reference arm 212 has a reference beam conducting body 27 or 27' in the form of another solid.

The length of collimated beam 25 in measuring arm 211 and its diameter are adapted to the dimensions of the measured object, e.g., the depth and diameter of a borehole to be measured. The section in which beam 25 is collimated may be designed as a glass cylinder, so that measuring probe 2 has a compact design.

The reference beam passes through a medium 27 of a great dispersion, such as a piece of glass, to compensate for the chromatic dispersion of measuring arm 211 and delay element 16 of modulation interferometer 1. The reference beam is returned by reflector 28, such as a mirror or a catadioptric element, in which case a compensating optical path difference between measuring arm 211 and reference arm 212 can be adjusted by adjustment of reflector 28 to compensate for the optical path difference created by delay element 16.

The measuring beam returned over measuring arm 211 and the reference beam returned over reference arm 212 interfere at third beam splitter 22 and are returned over optical fiber arrangement 4, which also serves to direct the combined beam to measuring probe 2, and are sent over an arm section 41 to receiving unit 3. Optical fiber arrangement 4 can be connected by plug connector 42, 42' to measuring probe 2 on the one hand and to modulation interferometer 1 and receiving unit 3 on the other hand. The plug connector of modulation interferometer 1, measuring probe 2 and/or receiving unit 3 may be arranged as a corresponding jack directly on the housing.

Receiving lens system 31 of receiving unit 3 causes the emission area of monomode optical fiber arrangement 4 to be imaged in the plane of a photoreceiving unit 33 after passing through a beam splitter 32. Each photodiode thus receives the image of the emission area of the optical fiber arrangement with a given wavelength.

As FIG. 2 shows, another beam splitter 29 in the form of a prism with which another measuring beam is split off is arranged in measuring arm 211. In comparison with the first continuous measuring beam, this additional measuring beam has a different output angle, so that surface areas of different orientations can be measured at the same time, with the position of the measuring probe with respect to the measured object being retained and no additional adjustment work being required. With respect to the additional measuring beam, this yields another optical path difference between measuring arm 211 and reference arm 212 which can be compensated by replacing delay element 16 with another delay element 16' of a suitably adjusted optical path difference. An accurate adjustment of the compensating optical path difference in measuring probe 2 can be performed, for example, by adjustment of reflector 28, so that the measuring beam split off is brought to interference with the reference beam. The measurement site can be identified by delay element 16 or 16' used and by coherence multiplexing. According to FIG. 2, however, a second reference arm having a second reference beam conducting body 27' and a second reflector 28' is formed to produce a compensating optical path difference coordinated with delay element 16' which has been replaced, so that two fixedly predetermined compensating optical path differences are obtained according to the two measuring beams and measuring sites coordinated with the optical path differences of delay elements 16, 16', although the compensating path differences are still to adjusted by a precision adjustment of reflector 28 or 28'. Two third beam splitters 22 and 22' are provided to form the two reference arms.

Accordingly, multiple measuring beams may also be formed by additional beam splitters 29, in which case a part of the measuring beam is always passed through beam splitter 29 to the beam splitter arranged behind it or the outlet of measuring arm 211 without deflection. The number of reference arms then preferably corresponds to the number of measuring beams formed, and a corresponding number of delay elements are also provided in modulation interferometer 1, so that there is a definite correlation with the measuring site by coherence multiplexing.

Another embodiment of the interferometric measuring device is shown in FIG. 3. The operation here corresponds to that according to FIG. 2. In contrast with the embodiment according to FIG. 2, measuring probe 2 is designed as an interferometer of the Fizeau type where a GRIN lens 21 is again provided in the form of a glass cylinder at the input of measuring probe 2 downstream from an optical fiber 26, for example, and GRIN lenses 21, 23, 21' and 23' are also arranged accordingly in the end area of the measuring arm. Upstream from the uncoupling point of the first measuring beam, a semitransparent optical element on which a portion of the beam guided into measuring probe 2 is reflected is arranged in the area of the input GRIN lens. Interference with the measuring beam split off at the first point in the path of the beam and reflected back from the surface to be measured takes place in this semitransparent element, in which case the optical path difference between the measuring beam and the reference beam formed on the semitransparent optical element is so great that the path difference of delay element 16 provided in modulation interferometer 1 is compensated. Accordingly, in the GRIN lens arranged in the beam path downstream from the splitting point of the first measuring beam is also arranged a semitransparent optical element 28.1' on which an interference is created in the manner described above with the measuring beam guided over the end area of measuring probe 2. The compensating optical path difference formed between this additional semitransparent optical element 28.1' and the respective measuring beam is matched to another delay element 16' arranged in modulation interferometer 1. Therefore, the measurement sites can also be identified in this design of the interferometric measuring device on the basis of coherence multiplexing based on optical delay element 16 or 16' used here.

Semitransparent optical elements 28.1, 28.1' are designed to be planar and perpendicular to the optical axis of the measuring beam and they may be arranged in a focusing point 28 of the optical beam or in a plane in which the beam passing through measuring arm 211 is collimated. A single reference beam may be provided for all measuring beams (or output prisms, i.e. a corresponding number of reflecting faces, of the measuring beams), i.e., a single reflecting face may be provided, or the same number of reference beams as measuring beams or output prisms may be provided. The optical path of the reference beam can be adjusted by varying the thickness of delay element 16, 16' in modulation interferometer 1. The thickness can be varied, for example, by rotating the pane of glass of delay element 16, 16' or by exchanging two plates of glass. The chromatic dispersion can be compensated by using a panel 18, 18' of a highly dispersive material, such as a plate of glass and a given thickness, in the other arm of modulation interferometer 1. To measure a given surface, it is sufficient to use a prism adapted to the profile of the surface to be measured and to use a corresponding glass plate as delay element 18, 18' or for compensation of chromatic dispersion in modulation interferometer 1.

The optical beam power of measuring beam in measuring arm 211 is usually much lower than the optical beam power of the reference beam in reference arm 212. It is therefore advantageous to design third beam splitter 22 or 22' to be asymmetrical to obtain an increased beam power of the measuring beam reflected back comparable to that of the reference beam.

In the case of the embodiment according to FIG. 3, it is advantageous that, except for the slender form, measuring probe 2 is less sensitive to changes in temperature due to the measuring arm and the reference arm running in a common arm.

One advantage of all embodiments is that the adjusting and regulating device of measuring probe 2 in modulation interferometer 1 is separate from the measuring probe. The same adjusting and regulating device can be used for a large number of measuring probes 2, thus making the measuring device cost effective.

What is claimed is:
1. An interferometric measuring device for detecting one of a shape, a roughness, and a distance of a surface, comprising:
    a modulation interferometer designed as a basic unit and including:
        a spatially coherent beam source,
        a first beam splitter for splitting a beam into a first partial beam and a second partial beam, and
        a modulation device, wherein:

one of a light phase and a light frequency of one of the first partial beam and the second partial beam is shifted with respect to another one of the first partial beam and the second partial beam by the modulation device, and the first partial beam and the second partial beam are combined; an optical fiber arrangement; a measuring probe that is spatially separate from the modulation interferometer and connectable to the modulation interferometer via the optical fiber arrangement, the measuring probe including:

a measuring arm, and a reference arm, wherein:

the combined first partial beam and the second partial beam are split into a measuring beam guided through the measuring arm and reflected on the surface and a reference beam guided through and reflected in the reference arm, the measuring arm is formed by a solid conducting the measuring beam, the reference arm is formed by a solid conducting the reference beam, and the reflected reference beam is superimposed on the reflected measuring beam to produce a superimposed beam; and a receiving unit for:

splitting the superimposed beam into at least a third beam and a fourth beam with a wavelength that is different than a wavelength of the third beam, converting the third beam and the fourth beam into corresponding electrical signals, and analyzing the corresponding electrical signals on the basis of a phase difference.

2. The measuring device according to claim 1, further comprising:

a collimator device arranged at an input of the measuring probe;

a focusing device arranged at an output of the measuring arm; and a deflecting element arranged downstream from the focusing device and for outputting and re-injecting the measuring beam directed at and reflected by the surface to be measured.

3. The measuring device according to claim 2, wherein:

at least one of the collimator device and the focusing device is a GRIN lens.

4. The measuring device according to claim 1, further comprising:

a delay element through which one of the first partial beam and the second partial beam passes and for generating a difference with respect to a first optical path length of the first partial beam and a second optical path length of the second partial beam, the difference being greater than a coherence length of the beam emitted by the short coherent beam source, wherein:

another difference in the first optical path length and the second optical path length is generated in the measuring arm with respect to the reference arm in order to compensate for the difference generated by the delay element.

5. The measuring device according to claim 1, wherein:

the measuring arm includes at least one additional deflecting element with which the measuring beam guided in the measuring arm is split and directed at another site on the surface to be measured, and the measuring beam reflected by the other site on the surface is injected back into the measuring arm.

6. The measuring device according to claim 5, further comprising:

a structure arranged with respect to the reference arm and including one of a reflecting element and a deflecting element; and a plurality of different interchangeable delay elements for selecting in the modulation interferometer different optical path lengths, wherein:

a compensating difference in the different optical path lengths is formed by adjusting the structure including the one of the reflecting element and the deflecting element of the reference arm.

7. The measuring device according to claim 5, further comprising:

a plurality of different interchangeable delay elements for selecting in the modulation interferometer different optical path lengths, wherein:

the reference arm corresponds to separate reference arms, the measuring beam corresponds to individual measuring beams, and a compensating difference in the different optical path lengths is formed by the separate reference arms assigned to the individual measuring beams split off in coordination with the plurality of different interchangeable delay elements.

8. The measuring device according to claim 1, wherein:

the measuring arm and the reference arm are designed as separate arms of the measuring probe in accordance with a Michelson interferometer.

9. The measuring device according to claim 1, wherein:

the measuring arm and the reference arm are designed as a common arm in accordance with a Fizeau interferometer.

10. The measuring device according to claim 1, further comprising:

a common monomode optical fiber arrangement; and an arm section, wherein:

a beam directed toward and away from the measuring probe is passed over the common monomode optical fiber arrangement, and a beam sent to the receiving unit is output from the common monomode optical fiber arrangement by the arm section.

* * * * *